2,934,450

CHROMIUM COMPLEXES OF FLUOROCARBON ACIDS AND ARTICLES COATED THEREWITH

Harvey A. Brown, Oakdale Township, Washington County, Minn., assignor to Minnesota Mining & Manufacturing Company, St. Paul, Minn., a corporation of Delaware No Drawing. Application December 29, 1955
Serial No. 556,039

9 Claims. (Cl. 106—287)

This invention relates to my discovery of novel fluorocarbon compounds having notable utility for sizing paper and the like to impart both repellency to water and resistance to penetration by oils and greases, and useful for other purposes. The invention includes paper and other articles that have been treated with these compounds.

More particularly, these new and useful compounds are green-colored water-soluble chlorine-containing chromium coordination complexes of perfluoroalkanesulfonamido alkylenemonocarboxylic acids that have in the acid molecule a perfluorocarbon "tail" containing 4 to 12 fully fluorinated carbon atoms.

The fluorocarbon carboxylic acids used in making these chromium complexes have the equivalent general formulas:

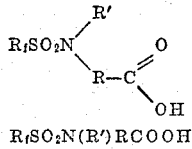

$R_fSO_2N(R')RCOOH$ wherein $R_f$ is a saturated perfluoroalkyl group containing 4 to 12 carbon atoms (which provides the perfluorocarbon "tail"), R is an alkylene bridging group containing 1 to 12 carbon atoms, and R' is a hydrogen atom or an alkyl group containing 1 to 6 carbon atoms (methyl, ethyl, propyl, butyl, amyl or hexyl).

These fluorocarbon acids may be regarded as N-substituted derivatives of amino acids of the monoaminomonocarboxylic type ($H_2N$—R—COOH) in which one N-bonded hydrogen atom is replaced by a perfluoroalkanesulfonyl group ($R_fSO_2$—) and the other hydrogen atom may or may not be replaced by a short-chain alkyl group.

The presently preferred acid is N-ethyl, N-perfluorooctanesulfonyl glycine, having the formula:

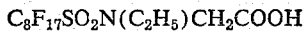

This compound is so named because it may be regarded as a derivative of glycine, an amino acid having the formula $H_2NCH_2COOH$. It has a perfluoroalkyl type of perfluorocarbon "tail" containing eight fully fluorinated carbon atoms.

My chromium complexes of these perfluoroalkanesulfonamido alkylenemonocarboxylic acids can be readily prepared by reacting chromyl chloride ($CrO_2Cl_2$) with the acid in an anhydrous solvent vehicle and in the presence of a reducing agent (which reduces the chromium to a trivalent state). A wide molar ratio range can be employed to obtain complexes useful for sizing paper and the like to obtain both water and oil resistance, this range being about 2 to 20 moles of chromyl chloride per mole of acid to provide complexes having a chromium to acid mole ratio of about 2:1 to 20:1.

Alcohols are the preferred reducing agents and can also serve as a reaction mixture solvent and as a solvent for the product. Isopropanol (isopropyl alcohol) is the preferred alcohol. The chromyl chloride is preferably diluted with a volatile inert solvent such as carbon tetrachloride in order to more easily avoid excessive reaction temperatures. The alcoholic product solution can be diluted to provide a concentrated solution of the chromium complex of standardized concentration suitable for shipment to users, for instance a 30% solution. This can be diluted with water at the time of use to provide a dilute aqueous treating solution of desired concentration, for instance a concentration of 0.01 to 10%.

The complexes are green-colored solid materials and the solutions are green-colored. The complexes are readily soluble in acetone and in alcohols. They are moderately and completely soluble in water but concentrated solutions require the use of an organic solvent, or a mixture of water-soluble organic solvent and water. Although the product solution can be evaporated in an oven to yield the complex in solid form, it is generally most convenient to supply users with a concentrated alcoholic solution of the complex as noted above, which is preferably a solution of the complex in isopropanol.

The present chromium complexes can be used generally for the surface treatment of hydrophilic materials including paper, cellulosic films, wood, leather, textile fibers, yarns and fabrics, lithic materials, glass and ceramic products, and metals, etc. When the complex, or a concentrated solution in an organic solvent, is dissolved in water and the aqueous solution is applied to the material and dried, the complex becomes hydrolyzed, chlorine atoms being replaced by hydroxyl groups. A neutralizing agent (such as urea) is preferably included in the solution to neutralize HCl that is evolved. The resultant hydrophilic electronegative polar groups provide a strong bonding to the hydrophilic substrate surface, and are capable of undergoing reactions leading to polymerization of the hydrolyzed complex. The process can be hastened by heating the treated material, for example at 250° F. for 2 minutes. This results in the formation of a strongly bonded polymeric coating, formed from the hydrolyzed and polymerized complex, which is highly insoluble and is both hydrophobic and oleophobic. The molecular structure is oriented so that the perfluorocarbon "tails" provide a fluorocarbon-like outer surface that is repellent both to water and to oils and greases. Extremely thin coatings are effective.

The treatment of paper, for example, can be conducted so that the treated paper has an imperceptible sizing coating which does not materially affect flexibility, strength, appearance or color. Porous paper can be treated so as not to materially decrease porosity, the individual fibers being coated and the treated paper being repellent to water and oils due to the hydrophobic and oleophobic nature of the fiber surfaces, although permitting the passage of air. Drops of water and drops of oil deposited on the sized paper will remain or run off rather than spreading and wetting the surface.

This makes possible the manufacture of high strength water-resistant paper which can be used for wrapping oily or greasy objects or materials, or as a liner for containers of oily or greasy materials. Papers that are both water-resistant and grease-resistant have many uses. It is advantageous for some purposes to be able to employ porous papers which are able to "breathe" and yet are resistant to penetration by water, oils and greases.

The present chromium complexes can be used in conjunction with other sizing materials, such as clay, starch, etc.

Returning to the perfluoroalkanesulfonamido alkylenemonocarboxylic acids employed in making the chromium complexes of this invention, the complete acid molecule has a perfluorocarbon "tail" group ($Rf$—) at one end and a carboxylic acid "head" group (—COOH) at the other end, which are linked together by an interposed sulfonamidoalkylene "body" group ($-SO_2N(R')R-$). The stable and inert perfluorocarbon "tail" is non-polar and is both hydrophobic and oleophobic. It is of critical importance that this "tail" provide a terminal chain of at least four perfluorinated carbon atoms (the preferred number being six to ten) in order to yield chromium complexes having the desired properties.

The perfluorocarbon structure may include an oxygen atom linking together two perfluorinated carbon atoms, or a nitrogen atom linking together three perfluorinated carbon atoms, since these linkages are very stable and do not impair the inert and stable fluorocarbon characteristic of the structure (cf., U.S. Patents Nos. 2,500,388 and 2,616,927).

The copending application of T. J. Brice and P. W. Trott, S.N. 448,784, filed August 9, 1954, and issued as Patent No. 2,732,398 on January 24, 1956, describes perfluoroalkanesulfonyl starting compounds that can be employed in making the fluorocarbon carboxylic acids from which the present chromium complexes are derived. These acids are described in more detail and are claimed in my companion application filed of even date herewith, S.N. 556,047 (now Patent 2,809,990).

The following procedure can be employed for manufacturing the preferred acid used in making the chromium complexes of the present invention, namely, N-ethyl, N-perfluorooctanesulfonamido glycine. The apparatus is a jacketed 750 gallon stainless steel kettle equipped with an agitator, means for heating and cooling, and distilling head.

The kettle is charged with 640 pounds of diisopropyl ether which is cooled to 65° F. and 108 pounds of ethylamine is added. Then 400 pounds of $C_8F_{17}SO_2F$ (perfluorooctanesulfonyl fluoride) is added at such a rate as to maintain the temperature at 75° F., requiring approximately two hours. The mixture is agitated for three hours at 75° F. and for two hours at 105° F. After cooling, the mixture is washed with 400 pounds of 9% hydrochloric acid solution, and the resultant aqueous and nonaqueous phases permitted to settle to form two layers. The lower (aqueous) layer is removed. The remaining product is rewashed with 400 pounds of an aqueous solution containing 4.5% hydrochloric acid and 4% ferrous sulfate solution, and the aqueous phase is again removed. Then 0.29 pound of morpholine is added to the product phase, and the ether is removed by distilling to a pot temperature of 180° F. at a pressure of 150 mm. This procedure provides the N-ethyl sulfonamido derivative of the starting compound.

The product is cooled and 1230 pounds of acetone is added. The mixture is thoroughly agitated and addition is made of a slurry of 31.5 pounds of sodium hydroxide, 10.0 pounds of sodium carbonate and 58.5 pounds of water. The reaction mixture is refluxed with agitation for 30 minutes and cooled. Then 11.0 pounds of sodium iodide and 186 pounds of ethyl chloroacetate are added, and the mixture is refluxed and agitated for a period of eight hours. The mixture is filtered to remove precipitated sodium chloride and sodium carbonate, the filtrate is recharged to the kettle, and the acetone is removed by distilling to a pot temperature of 180° F. at a pressure of 150 mm. This procedure provides the ethyl ester of the desired acid product. A solution of 112 pounds of sodium hydroxide in 1540 pounds of water is added to the kettle material, and the mixture is agitated for 30 minutes at a temperature of 180° F., thereby obtaining the sodium salt of the acid.

Then 270 pounds of concentrated sulfuric acid is added to the kettle at such a rate as to maintain the temperature at 180° F., and the acidified slurry is cooled slowly. The slurry is removed from the kettle and filtered on a filter press. The wet cake contains the desired product acid in crude form, the over-all yield of crude acid being in the neighborhood of 90%.

The following purification procedure can be employed. The wet acid cake (75% solids) in the amount of 6.70 parts by weight is slurried with a solution consisting of 0.75 parts of glacial acetic acid and 5.05 parts of water. The mixture is agitated and heated to a temperature of 175° F. and is then allowed to cool without agitation. The resulting slurry is filtered on a centrifuge. The filter cake is oven dried at a temperature of 180° F. to yield 3.88 parts of purified acid in dry solid form, suitable for use in making chromium complexes.

The following examples illustrate the preparation of my chromium complexes.

Example 1

Use was made of purified N-ethyl, N-perfluorooctanesulfonyl glycine prepared in the manner described above. A mixture was prepared of 3.58 pounds of the acid and 21.60 pounds of isopropanol, which was heated to 130° F. and filtered while hot to remove alcohol-insoluble material. The filtrate was charged to a 22 liter Pyrex glass flask and isopropanol was added to give a total of 29.40 pounds of solution. The flask was fitted with a reflux condenser, serving as a distilling head, and the mixture was agitated while a solution consisting of 5.45 pounds of carbon tetrachloride and 2.79 pounds of chromyl chloride was slowly added below the surface of the liquid. The rate of addition was adjusted so as to maintain the temperature of the reaction mixture at 110° F. Then the mixture was subjected to distillation to remove a total of 19.00 pounds of distillate, thereby substantially eliminating the carbon tetrachloride and the volatile organic by-products. The mixture was cooled and 0.26 pound of water and 1.60 pounds of isopropanol were added, to provide a 30% solution of the chromium complex in isopropanol solvent. The small percentage of water is included because it has been found to exert a desirable stabilizing action that prevents precipitation of solids upon long standing.

This 30% solution of the complex is adapted to be stored and shipped as a concentrate which the user can employ in making up aqueous treating solutions. For each 1% of treating solution concentration, 3.5 parts by weight of the concentrated solution is used and is mixed with sufficient water at 70–80° F. to make a total of 100 parts by weight of treating solution. Thus in making a paper sizing solution of ½% chromium complex concentration, 1.75 parts of concentrate is diluted with 98.25 parts of water to make 100 parts of treating solution. Preferably 2 parts of urea is added as a neutralizer for each part of chromium complex; hence in making the ½% solution just mentioned, addition would be made of one part of urea per 100 parts of treating solution. The urea (or equivalent) serves to neutralize the HCl that is formed upon hydrolysis of the complex. In general, treating solutions of 0.01 to 10% chromium complex concentration are suitable for sizing paper and the like, the optimum concentration depending upon the type of material, manner of application, and degree of water and oil repellency desired.

Paper can be treated as a part of the manufacturing operation in the paper mill. For example, in manufacturing kraft paper, the chromium complex sizing solution can be applied to the paper at the size press, being pumped from a reservoir through two spray pipes so as to saturate the paper from both sides before it enters a pair of squeeze rolls, and the excess solution from the squeeze rolls being returned to the reservoir. Machine speeds of 160 to 870 feet per minute have been employed in test runs. The chromium complex sizing becomes hydrolyzed and polymerized during passage through the paper making machine where it is subjected to heating.

The mole ratio of chromium to acid is 3:1 in the above example. It has been found that substantially higher mole ratios can be employed in making the present type of chromium complexes to provide effective sizing of paper, namely, ratios of 5:1 to 15:1, or even higher. This has the important advantage of materially reducing the cost since the fluorocarbon acid is the most expensive material employed.

The following examples illustrate the preparation of still other chromium complexes which can be employed to impart water and oil repellency.

*Example 2*

To a solution in 10 ml. isopropanol of 1.5 grams of N-perfluorooctanesulfonyl glycine, having the formula:

$$C_8F_{17}SO_2NHCH_2COOH$$

there was slowly added a solution of 1.6 grams of chromyl chloride in 4 ml. of carbon tetrachloride. After the reaction was completed the carbon tetrachloride was distilled off and the resulting solution was diluted to 50 ml. with isopropanol. The resultant green-colored solution contained the desired chromium complex.

*Example 3*

A solution in 22.8 grams isopropanol of 3.0 grams of $$C_8F_{17}SO_2NHCH_2CH_2COOH$$

was added dropwise to a solution of 2.45 grams of chromyl chloride in 4.77 grams of carbon tetrachloride, the rate of addition maintaining the mixture at reflux. Then 15.3 grams (16.7 ml.) of volatiles was removed by distillation and 0.5 gram of water was added. The resultant green-colored solution contained the desired chromium complex.

*Example 4*

A solution in 75 grams isopropanol of 8.0 grams of N-perfluoropentanesulfonyl glycine:

$$C_5F_{11}SO_2NHCH_2COOH$$

was added dropwise to a solution of 9.15 grams of chromyl chloride in 17.9 grams of carbon tetrachloride, the rate of addition maintaining the mixture at reflux. Then 56.6 grams of volatiles was removed by distillation and 0.8 gram of water was added. The resultant green-colored solution contained the desired chromium complex.

I claim.

1. Green-colored water - soluble chlorine - containing chromium coordination complexes of perfluoroalkanesulfonamido alkylenemonocarboxylic acids that have the formula:

$$R_fSO_2N(R')RCOOH$$

wherein $R_f$ is a perfluoroalkyl group containing 4 to 12 carbon atoms, R is an alkylene bridging group containing 1 to 12 carbon atoms, and R' is of the class consisting of a hydrogen atom and of alkyl groups containing 1 to 6 carbon atoms; these complexes having a chromium to acid mole ratio of about 2:1 to 20:1 and being capable of hydrolysis and polymerization to provide insoluble coatings that are both hydrophobic and oleophobic.

2. Green - colored water - soluble chlorine - containing chromium coordination complexes of N-ethyl, N-perfluorooctanesulfonyl glycine, having a chromium to acid mole ratio of about 2:1 to 20:1.

3. A concentrated solution of isopropanol and a dissolved chromium complex defined in claim 1.

4. A concentrated solution of isopropanol and a dissolved chromium complex defined in claim 1, containing a small percentage of water to enhance stability.

5. A concentrated solution of isopropanol and a dissolved chromium complex defined in claim 2.

6. A concentrated solution of isopropanol and a dissolved chromium complex defined in claim 2, containing a small percentage of water to enhance stability.

7. An article having a hydrophilic type surface upon which is tightly bonded a thin insoluble coating film comprised of a hydrolyzed and polymerized chromium complex defined in claim 1.

8. Paper sized with a hydrolyzed and polymerized chromium complex defined in claim 1.

9. A process of making chromium coordination complexes useful for coating or treating materials to obtain insoluble coatings that are both hydrophobic and oleophobic, which comprises reacting chromyl chloride in an anhydrous isopropanol solvent vehicle which also serves as a reducing agent, with a perfluoroalkanesulfonamido alkylenemonocarboxylic acid having the formula:

$$R_fSO_2N(R')RCOOH$$

wherein $R_f$ is a perfluoroalkyl group containing 4 to 12 carbon atoms, R is an alkylene bridging group containing 1 to 12 carbon atoms, and R' is of the class consisting of a hydrogen atom and of alkyl groups containing 1 to 6 carbon atoms; the chromium to acid mole ratio being about 2:1 to 20:1.

References Cited in the file of this patent
UNITED STATES PATENTS

| | | |
|---|---|---|
| 2,662,835 | Reid | Dec. 15, 1953 |
| 2,693,458 | Olsen | Nov. 2, 1954 |
| 2,713,593 | Brice | July 19, 1955 |